(12) United States Patent
Weidemann et al.

(10) Patent No.: US 10,308,449 B2
(45) Date of Patent: Jun. 4, 2019

(54) SHUTTLE BAR FOR TRANSPORT OF RAILCAR PALLETS, FREIGHT-HANDLING DEVICE, AND FREIGHT-HANDLING METHOD

(71) Applicant: CargoBeamer AG, Leipzig (DE)

(72) Inventors: Hans-Jürgen Weidemann, Speyer (DE); Imad Jenayeh, Aachen (DE); Bernd Rudat, Plauen (DE)

(73) Assignee: CargoBeamer AG, Leipzig (DE)

( * ) Notice: Subject to any disclaimer, the term of this patent is extended or adjusted under 35 U.S.C. 154(b) by 5 days.

(21) Appl. No.: 15/277,606

(22) Filed: Sep. 27, 2016

(65) Prior Publication Data

US 2018/0086576 A1 Mar. 29, 2018

(51) Int. Cl.
*B65G 67/02* (2006.01)
*B65G 63/02* (2006.01)
*B61D 47/00* (2006.01)
*B61J 1/10* (2006.01)

(52) U.S. Cl.
CPC ............ *B65G 67/02* (2013.01); *B61D 47/005* (2013.01); *B61J 1/10* (2013.01); *B65G 63/025* (2013.01)

(58) Field of Classification Search
CPC ...... B61D 47/00; B61D 47/005; B65G 63/02; B65G 63/022; B65G 63/025; B65G 67/02; B65G 67/04; B65G 67/24; B61J 1/10
USPC ......................................................... 414/392
See application file for complete search history.

(56) References Cited

U.S. PATENT DOCUMENTS

| 4,093,084 A * | 6/1978 | Ringer .................. B65G 17/345 104/88.02 |
| 4,522,546 A * | 6/1985 | Ringer .................. B65G 63/025 104/48 |
| 6,860,698 B1 | 3/2005 | Viragh et al. |
| 7,950,891 B2 * | 5/2011 | Weidemann ............. B61D 3/04 414/344 |
| 8,348,585 B2 * | 1/2013 | Salmoiraghi .......... B65G 67/02 414/392 |

(Continued)

FOREIGN PATENT DOCUMENTS

| BY | 8597 C1 | 10/2006 |
| CN | 102249984 A | 11/2011 |

(Continued)

OTHER PUBLICATIONS

English language translation of previously cited Patent document JP 59194938 A, included as an appendix to the Oct. 24, 2018 final Office action. (Year of translation: 2018).*

*Primary Examiner* — James Keenan
(74) *Attorney, Agent, or Firm* — Brinks Gilson & Lione

(57) ABSTRACT

A shuttle bar (20) for a freight-handling device for transferring cargo from road to rail and vice versa using horizontal transverse loading, for moving a railcar pallet of a freight car to a loading platform and vice versa, wherein the shuttle bar (20) includes lifting mechanism for raising and lowering of the railcar pallet from or onto a railcar undercarriage of the freight train as well as from or onto the loading platform, wherein the shuttle bar (20) includes a bar base frame (30), a lifting bar (31), and a lifting-bar drive device (32) for raising and lowering the lifting bar (31) relative to the bar base frame (30), as well as a freight-handling device for combined freight transport with such shuttle bars, and a freight-handling method.

33 Claims, 13 Drawing Sheets

(56) References Cited

U.S. PATENT DOCUMENTS 9,248,984 B2  2/2016  Andre et al.
2005/0158158 A1 * 7/2005  Porta ..................... B61D 47/00
                                              414/392

FOREIGN PATENT DOCUMENTS

| | | | | |
|---|---|---|---|---|
| DE | 1 257 821 | 1/1963 | | |
| DE | 100 03 315 A1 | 12/2000 | | |
| DE | 101 07 306 A1 | 10/2002 | | |
| DE | 10 2009 012 159 A1 | 9/2010 | | |
| DE | 10 2009 015 775 A1 | 10/2010 | | |
| DE | 10 2012 004 292 A1 | 9/2013 | | |
| DE | 10 2012 004 945 A1 | 9/2013 | | |
| DE | 10 2014 013 778 A1 | 3/2016 | | |
| DE | 102015006224 A1 * | 11/2016 | ............ | B65G 63/00 |
| EA | 201370031 A1 | 6/2013 | | |
| EP | 0288726 A * | 11/1988 | ............ | B65G 67/02 |
| EP | 1 798 131 A1 | 8/2005 | | |
| JP | 59194938 A * | 11/1984 | ............ | B65D 67/02 |
| RU | 2 393 967 C9 | 5/2011 | | |
| WO | WO 2001/28836 A1 | 4/2001 | | |
| WO | WO-2006018242 A2 * | 2/2006 | ............ | B65G 63/00 |
| WO | WO 2007/104721 A1 | 9/2007 | | |
| WO | WO 2012/014150 A1 | 2/2012 | | |
| WO | WO 2013/167315 A1 | 11/2013 | | |

\* cited by examiner

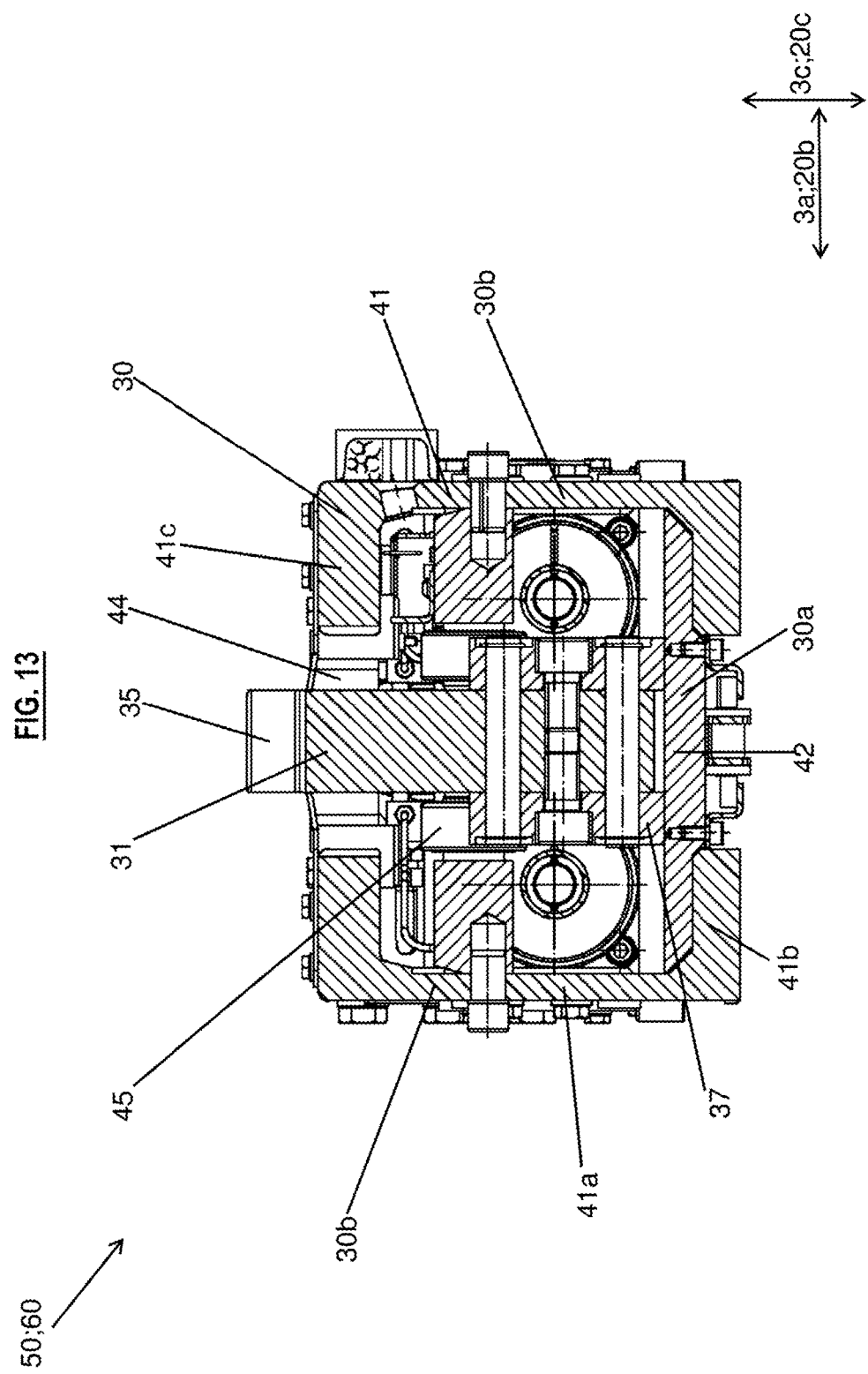

SHUTTLE BAR FOR TRANSPORT OF RAILCAR PALLETS, FREIGHT-HANDLING DEVICE, AND FREIGHT-HANDLING METHOD

FIELD OF THE INVENTION

The present invention relates to a shuttle bar for the transport of railcar pallets of railcars transverse to the track in a freight-handling device for combined freight transport. The invention moreover relates to a freight-handling device for combined freight transport with such shuttle bars, and a freight-handling method.

BACKGROUND

A freight-handling device for combined freight transport for a terminal or rail-platform-handling for the handling or moving of freight such as containers, semi trailers, truck trailers, trailers of articulated trains, standard intermodal loading units (ISO type C) or the like from road to rail and vice versa is known from DE 10 2009 012 159 A1. The handling or moving is effected here by horizontal rail-leveled transverse loading of multimodal elements or railcar pallets using transverse-transport devices. "Rail-leveled" means that no particular rail-platform height is required, or that the handling surface of the terminal or rail platform has the same or nearly the same work level as the rail line of the track system or the axle height of the railcars.

The freight-handling device of DE 10 2009 012 159 A1 includes a track system with two tracks as well as a somewhat rail-leveled loading platform disposed adjacent to the track system and parallel thereto. Furthermore the freight-handling device includes a plurality of shuttle bars for the transverse transport of the multimodal elements from a railcar onto the loading platform or vice versa. The shuttle bars each have lifting devices and are movable back and forth in the transverse direction on carrier-rail elements disposed underfloor in transverse grooves of the loading platform.

The lifting devices are lifting pistons or not-further-described lever arrangements.

The cargo is set down and supported on the trough-shaped multimodal elements. Thereby, the multimodal elements are supported on the two side walls of the railcar. To unload the railcars the shuttle bars are driven under the railcar, the multimodal element is lifted by the lifting devices, and the railcar side walls are folded away outward to the side. Thereby, the railcar side walls are swung into a gap present between the carrier rails so that they can be run over by the shuttle bars carrying the multimodal elements. The multimodal elements are then lowered by lowering onto the loading platform.

A further freight-handling device of the above-described type with shuttle bars arises from DE 10 2012 004 945 A1. For locking and unlocking as well as folding down and folding up the side walls, this device includes a particular swivel- and unlocking-device.

The known freight-handling devices have proven themselves.

The object of the present invention is the provision of a shuttle bar for the transport of railcar pallets of freight cars transverse to the track in a freight-handling device for combined freight transport, which makes possible the lifting and lowering of the railcar pallet in a simple and functionally secure manner and with little power expenditure.

Further objects are the provision of a freight-handling device with such shuttle bars and the provision of a freight-handling method.

These objects are achieved by a shuttle, a freight-handling device, and a freight-handling method as described herein.

BRIEF DESCRIPTION OF THE DRAWINGS

The invention is exemplarily explained in more detail in the following with reference to the drawings.

FIG. 13 shows a cross-section through the center of the inventive shuttle bar.

DETAILED DESCRIPTION

Figure 1:
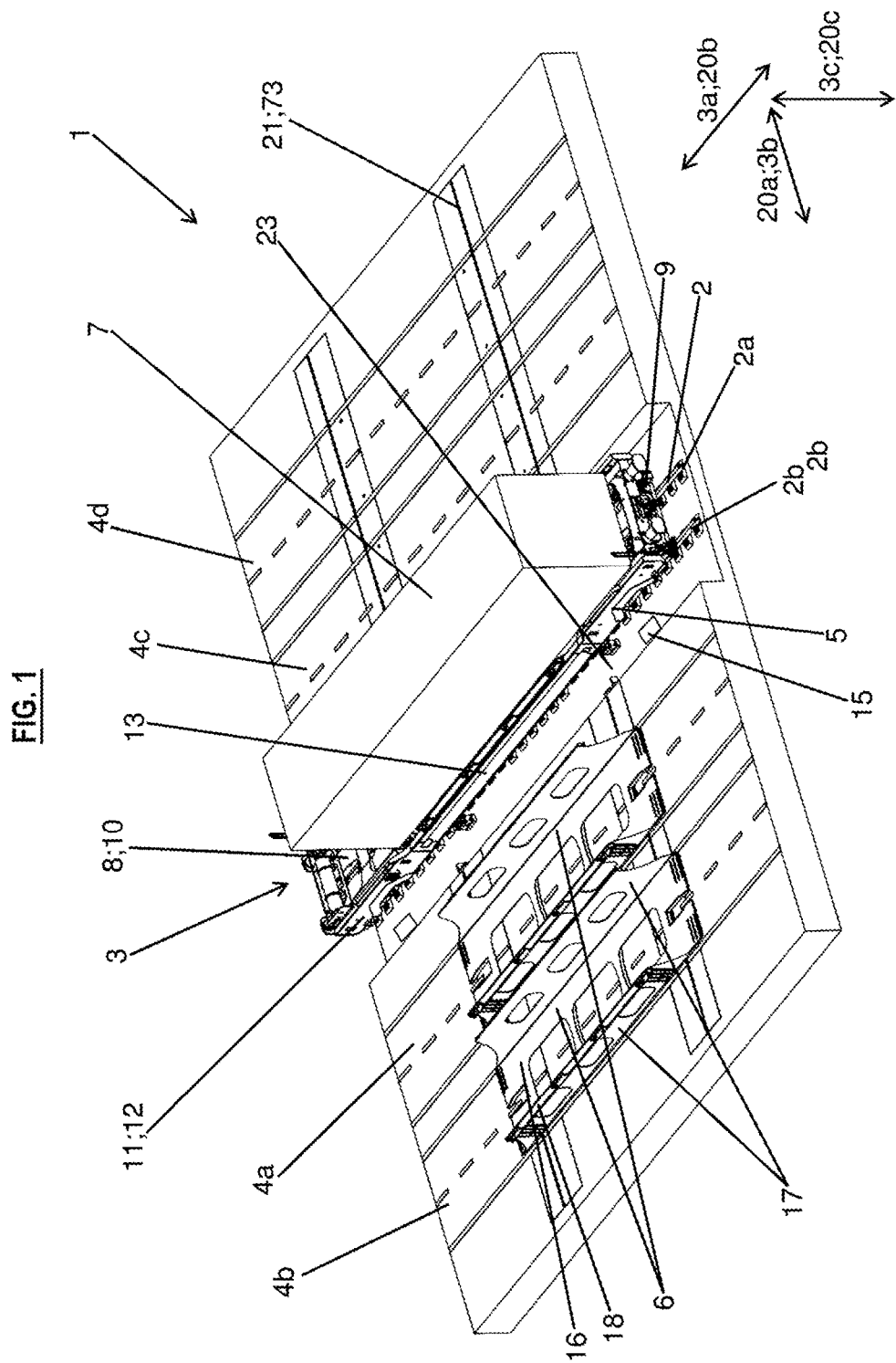
FIG. 1 shows a perspective schematic view of an inventive freight-handling device with a freight car with folded-up railcar side walls.
Figure 2:
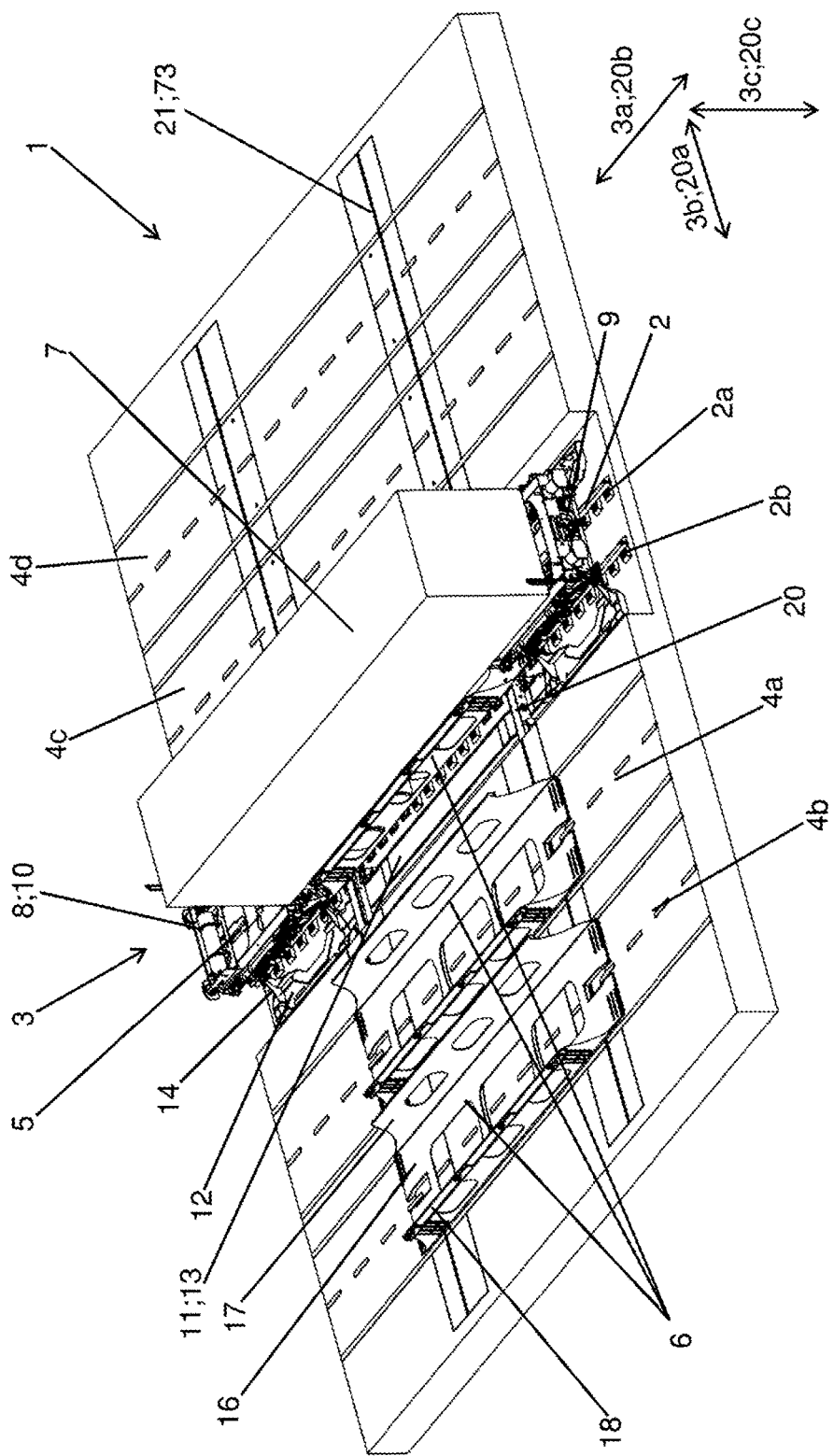
FIG. 2 shows a perspective schematic view of the inventive freight-handling device with a freight car with folded-out railcar side walls.

The inventive freight-handling device 1 (FIGS. 1-5) serves for loading and unloading freight trains, in particular for transferring freight from road, factories, or manufacturing plants to rail and vice versa, wherein the transferring occurs using rail-leveled transverse loading. Thereby, the freight-handling device 1 can be disposed in a plant or a factory or a logistics or freight-distribution-center or the like. The freight-handling device 1 includes at least one railway rail or rail system 2 with two mutually parallel rail lines or track lines 2a; 2b on which the freight trains with locomotive (not depicted) and railcars or freight cars 3 connected thereto are movably supported. On both sides adjacent to and outside the rail system 2 a plurality of somewhat rail-leveled loading platforms 4a-d are provided. "Rail-leveled" means that the platform surface of the loading platforms 4a-d corresponds to the height of the upper rail edge or is only slightly higher, e.g., by 10 to 50 cm. In contrast thereto, with cranes the load is lifted by approximately 5 m. The loading platforms 4a-d are respectively disposed adjacent to one another in a direction transverse to the track lines 2a;2b. Up to five loading platforms 4a-d are preferably disposed on each side of the rail system 2.

A freight car 3 (FIGS. 1-5) respectively includes a wagon undercarriage 5 in a known manner and a railcar pallet 6 placed thereon, in particular hung into it, which receives the cargo to be transported, e.g., a semi trailer 7 or a truck trailer or a container. In addition the freight car 3 has a horizontal railcar longitudinal direction 3*a* extending parallel to the track lines 2*a;* *b* and a horizontal railcar transverse direction 3*b* perpendicular thereto, as well as a vertical railcar height direction 3*c*. The railcar undercarriage 5 includes in a known manner a railcar frame 8 as well as two, in particular, two-axle bogies 9, spaced from each other in the railcar longitudinal direction 3*a*, for moving the freight car 3 onto the rail system 2. Instead of the bogies 9, individual axes (not depicted) can also be provided.

The railcar frame 8 includes two stems or railcar headpieces 10 spaced from each other in the railcar longitudinal direction 3*a*, which stems or railcar headpieces 10 are each disposed face-side or end-side of the railcar undercarriage 5. The two railcar headpieces 10 are each supported in a known manner on one of the two bogies 9. Thereby, the two railcar headpieces 10 are each fixedly connected to the respective bogie 9.

Furthermore a known kingpin locking device is also located topside and centrally on both railcar headpieces 10, which kingpin locking device is for receiving and latching or locking a kingpin of the semi trailer 7 in the horizontal and/or vertical direction relative to the railcar undercarriage 5. The kingpin locking device is preferably configured according to DE 10 2009 015 775 A1.

The railcar frame 8 also includes two foldable railcar side walls 11. These rigidly connect the two railcar headpieces 10 to each other, i.e., so that they can neither be moved nor rotated with respect to each other. Thereby, the railcar side walls 11 are each supported for pivoting motion about a side-wall swivel axis on the railcar headpiece 10, which sidewall swivel axis is parallel to the railcar longitudinal direction 3*a*.

The two railcar side walls 11 each include a wall top edge. In addition, the two railcar side walls 11 of a freight car 3 each include two end-side support crosspieces 12 and a central load-bearing crosspiece 13 disposed between them. The two support crosspieces 12 and the load-bearing crosspiece 13 are fixedly connected to one another, in particular configured in one-piece. The load-bearing crosspiece 13 serves to receive or support the railcar pallet 6. The two support crosspieces 12 serve for pivotable support of the railcar side walls 11 on the railcar headpieces 10 about the respective side-wall swivel axis. For this purpose the railcar side walls 11 include in a known manner, in particular respectively four, support arms 14 that are at one end each fixedly connected, i.e., such that they can neither move nor rotate, to the support crosspieces 12, in particular they are welded thereto, and that on the other end include a pivot bearing.

Figure 3:
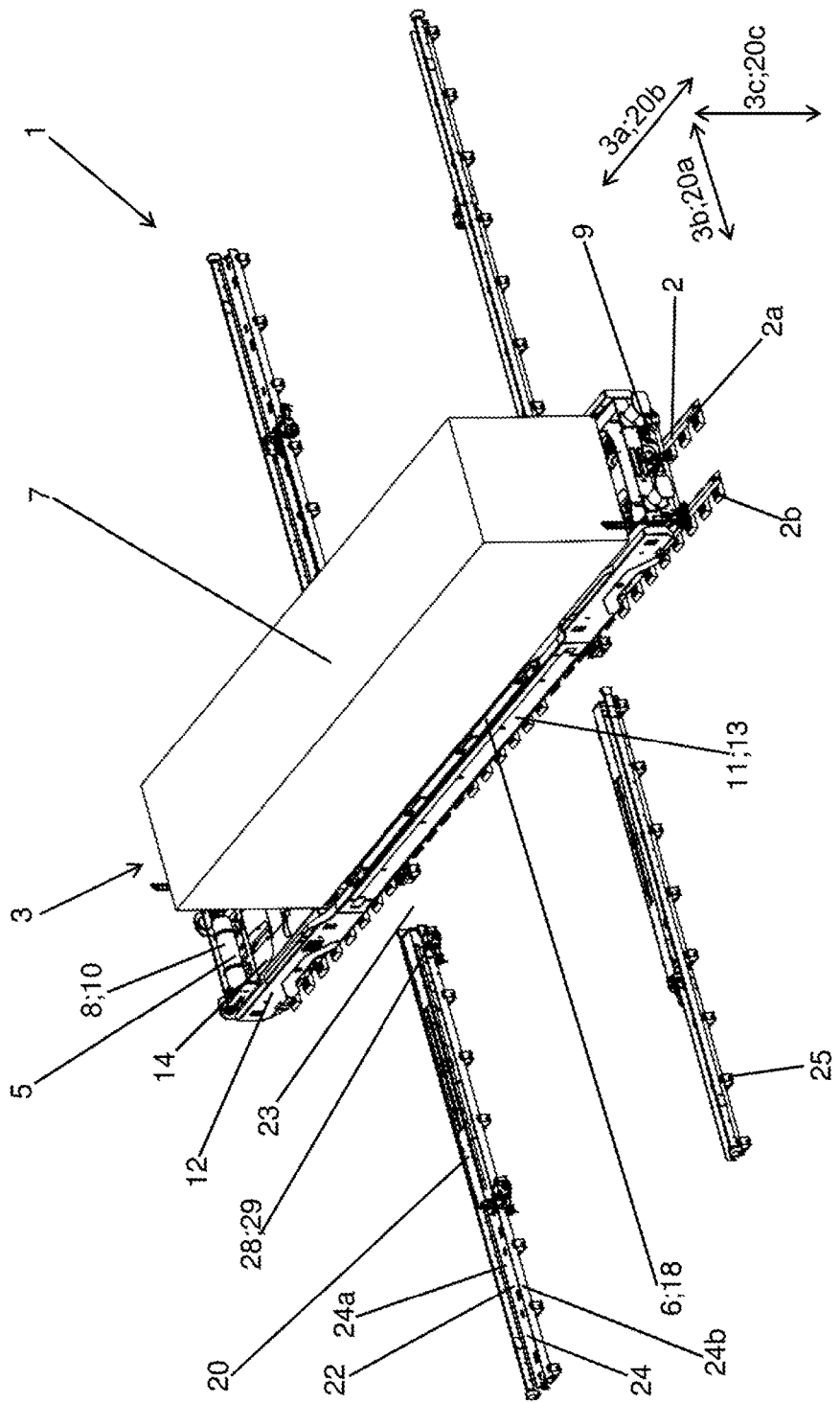
FIG. 3 shows a perspective schematic view of the inventive freight-handling device without loading platforms with a freight car with folded-up railcar side walls.
Figure 4:
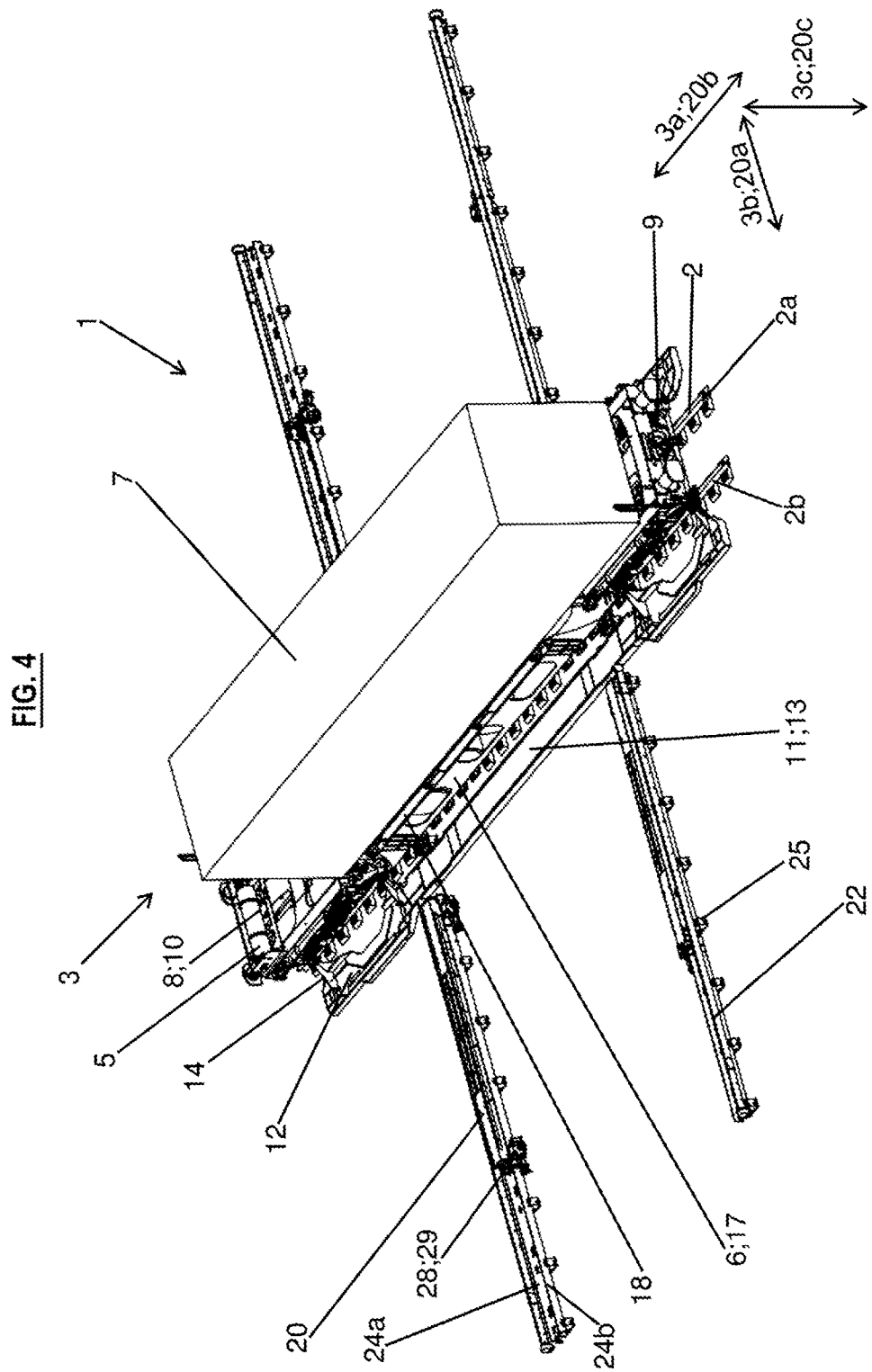
FIG. 4 shows a perspective schematic view of the inventive freight-handling device without loading platforms with a freight car with folded-out railcar side walls.
Figure 5:
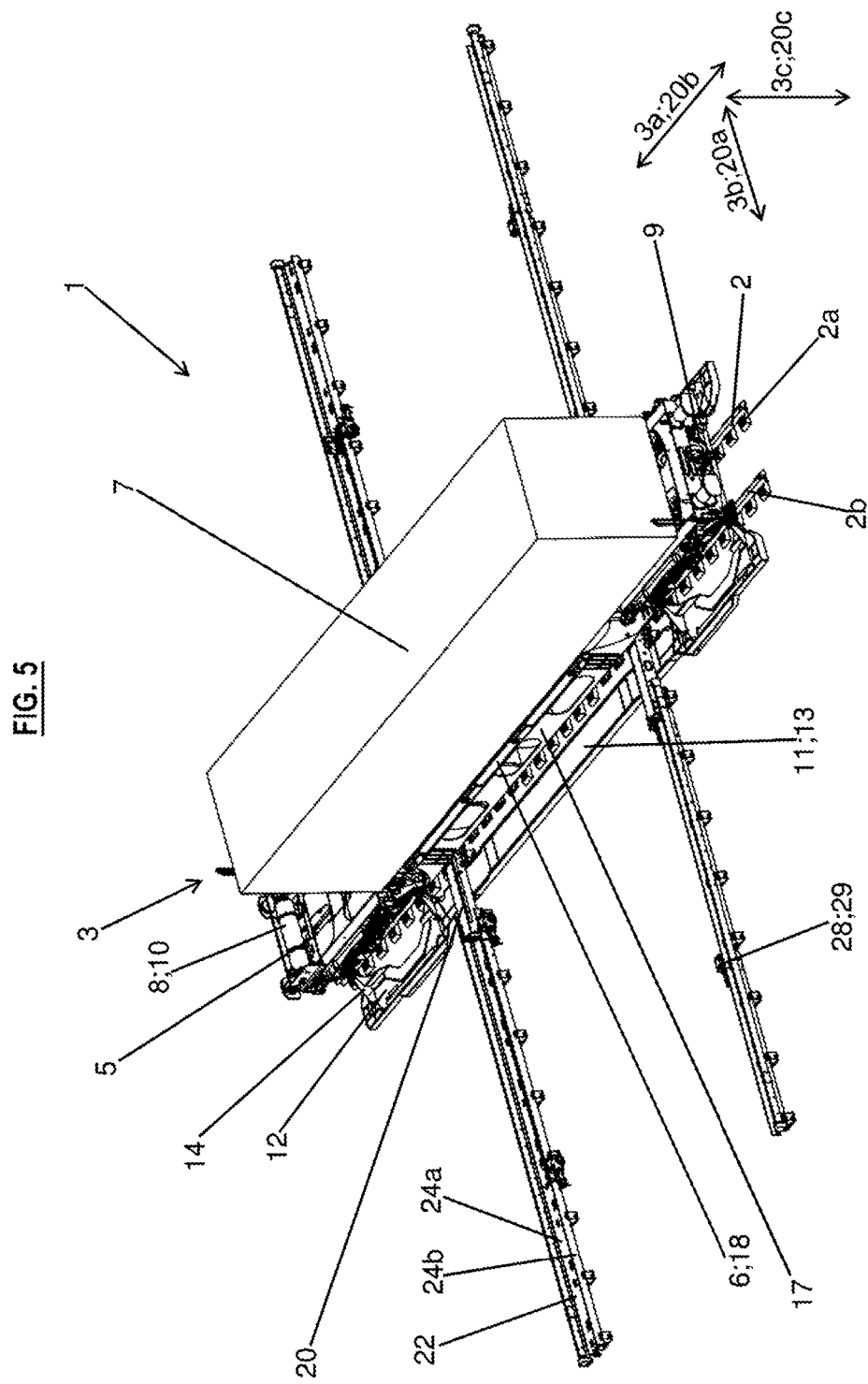
FIG. 5 shows a perspective schematic view of the freight-handling device according to FIG. 4 with shuttle bars driving under the freight car.
Figure 6:
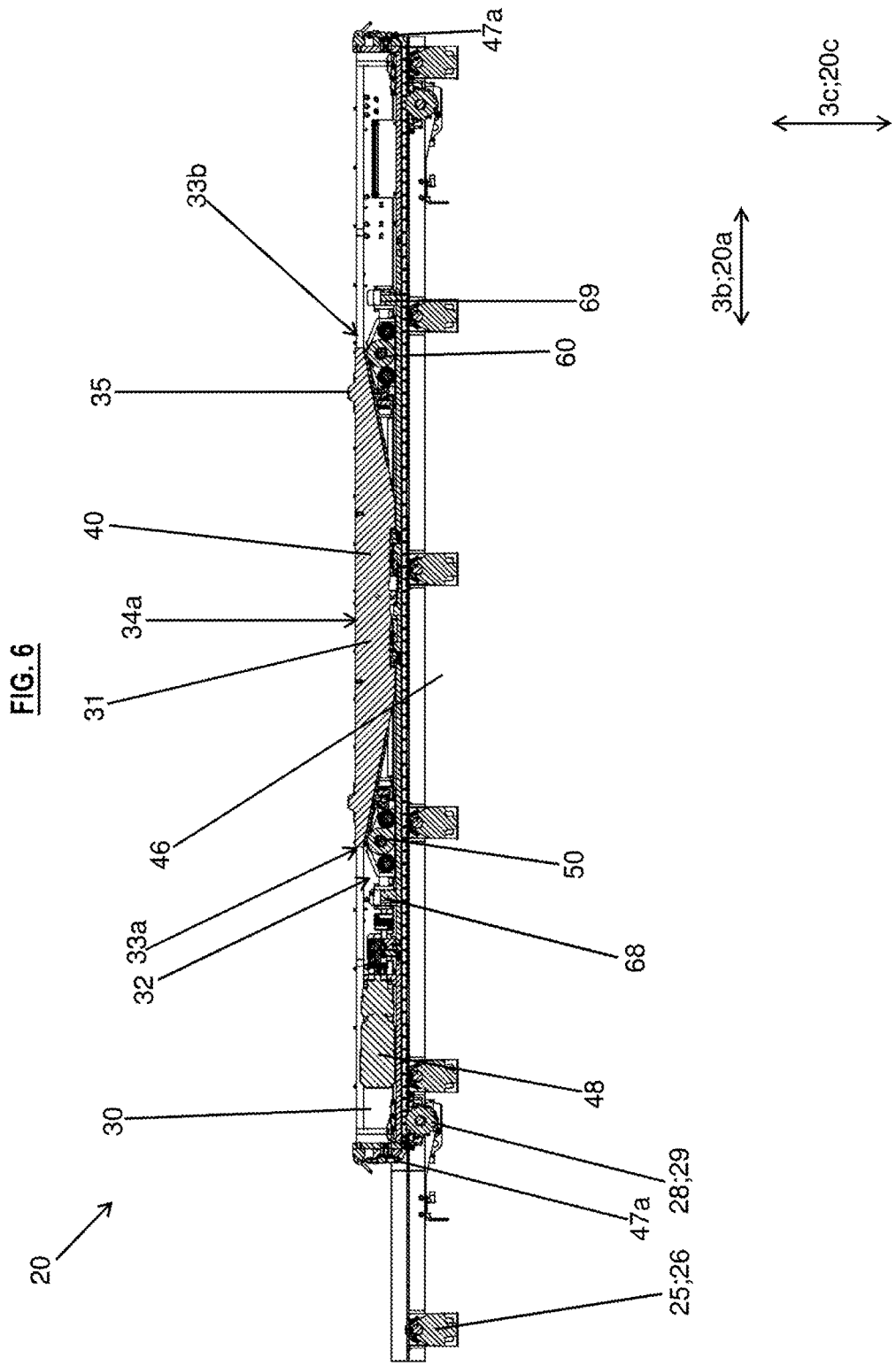
FIG. 6 shows a longitudinal section of the inventive shuttle bar on a conveyor lane.
Figure 7:
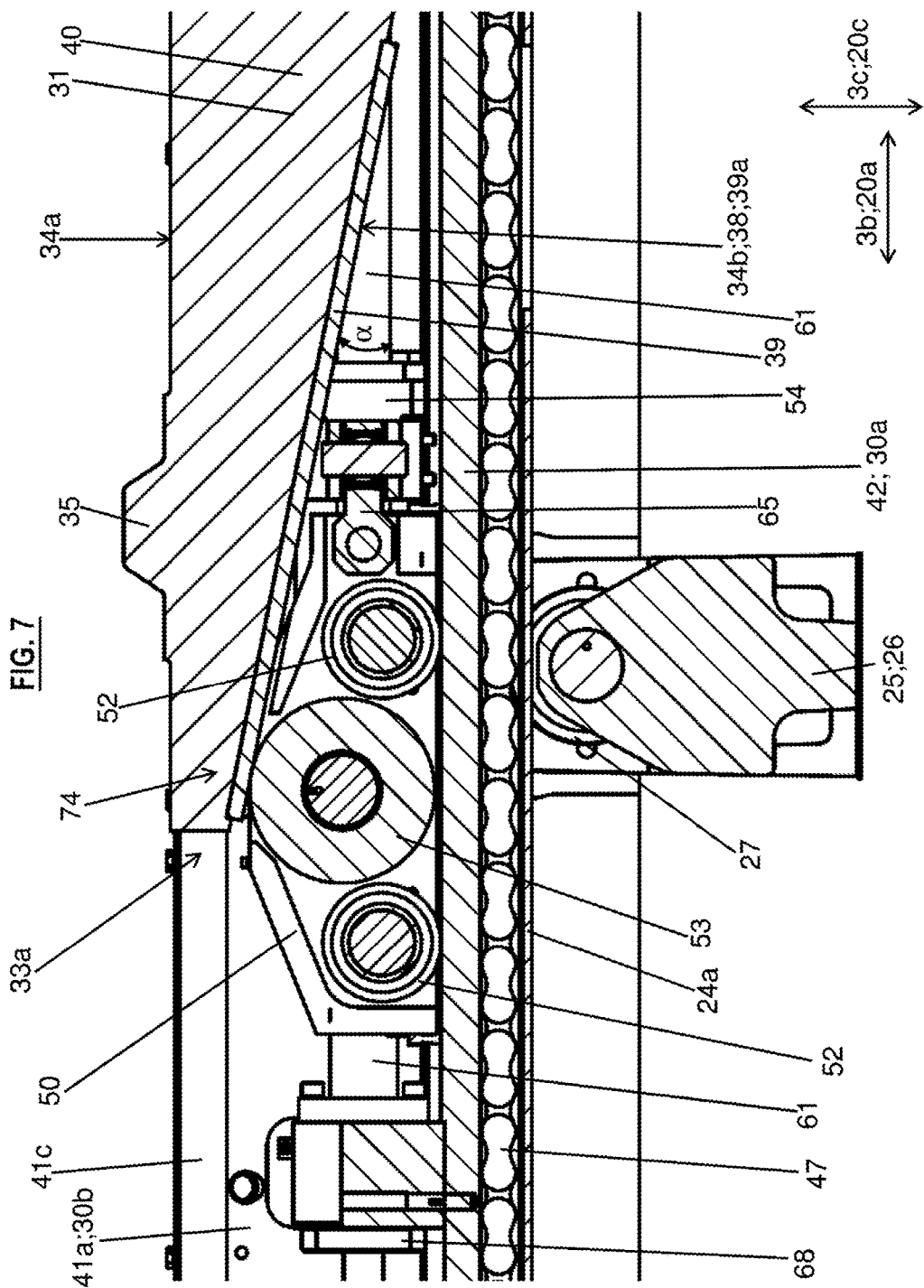
FIG. 7 shows an enlarged section of the longitudinal section according to FIG. 6.
Figure 8:
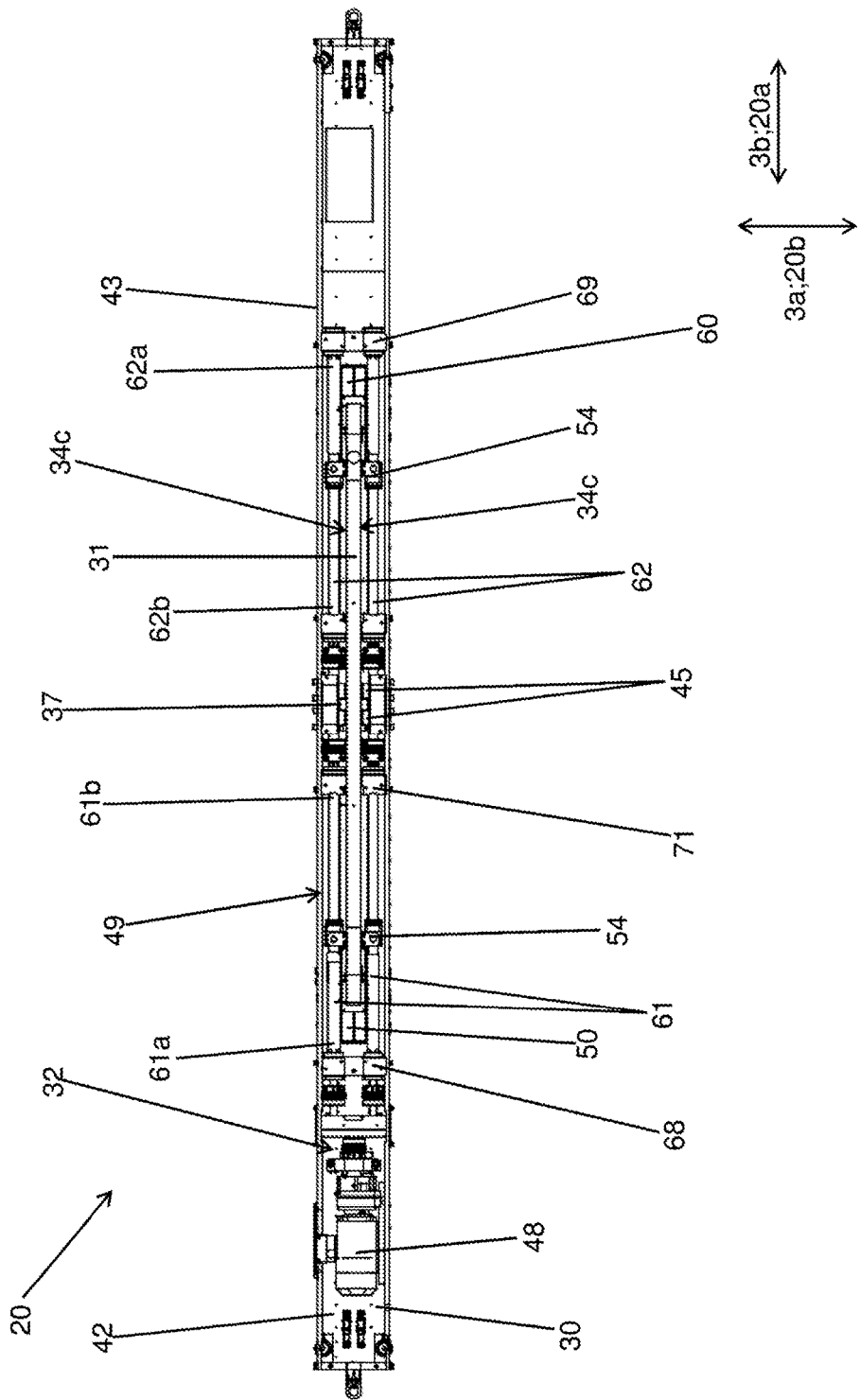
FIG. 8 shows a plan view of the inventive shuttle bar without upper limb walls.
Figure 9:
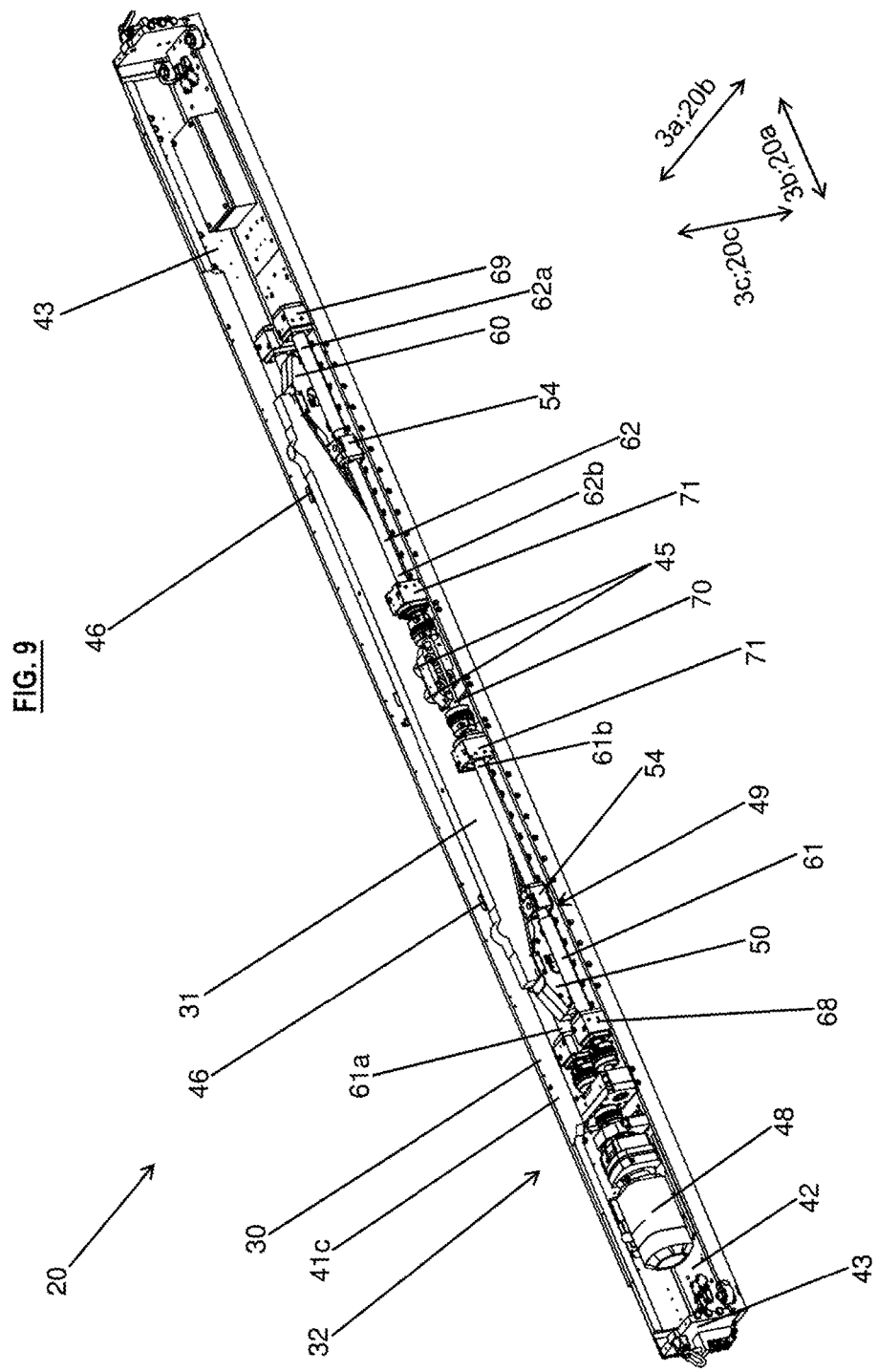
FIG. 9 shows a perspective plan view of the inventive shuttle bar without one of the two housing side walls and with largely cut-away housing cover wall.
Figure 10:
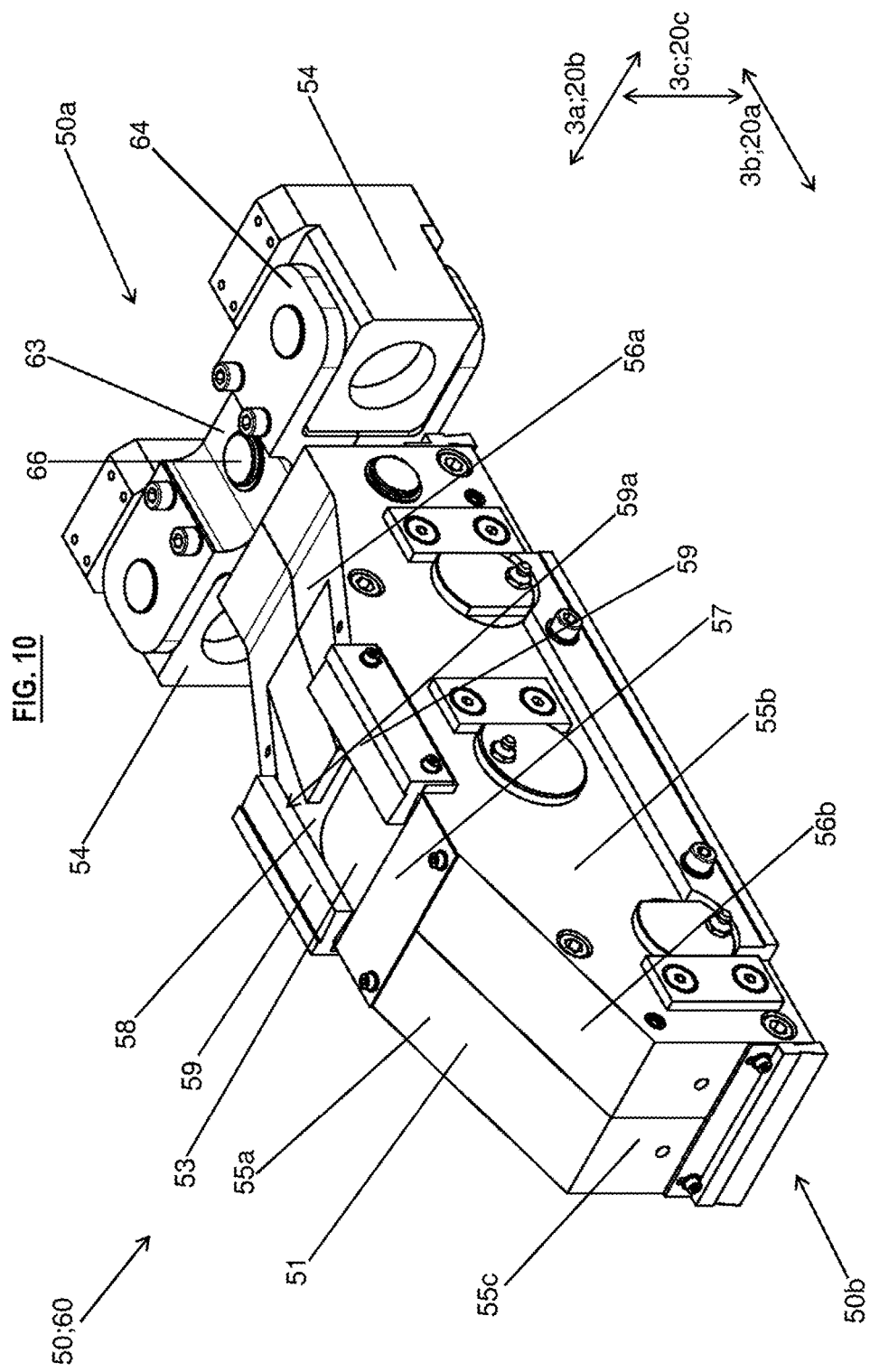
FIG. 10 shows a perspective plan view of a lifting car of the inventive shuttle bar.
Figure 11:
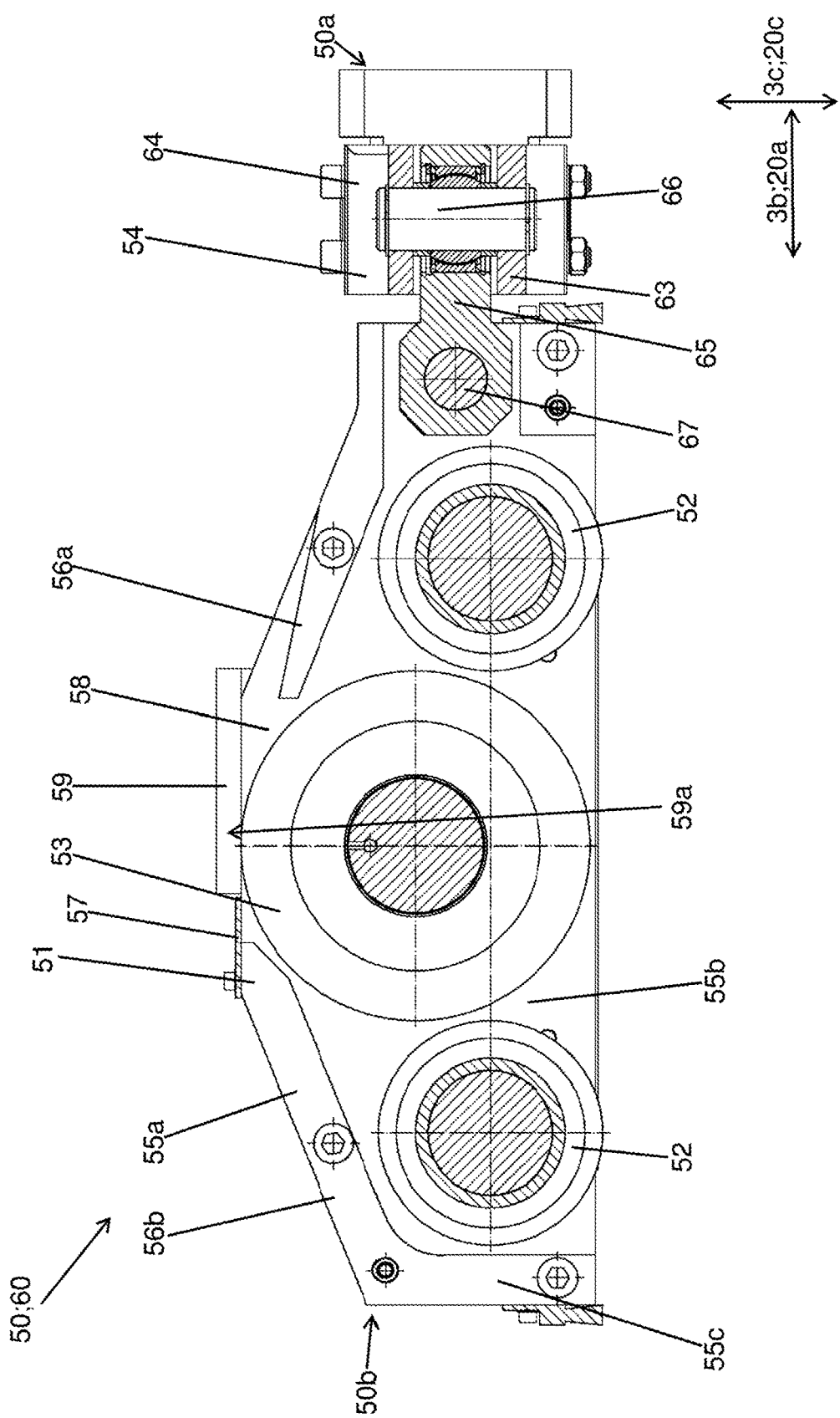
FIG. 11 shows a longitudinal section through the lifting car according to FIG. 10.
Figure 12:
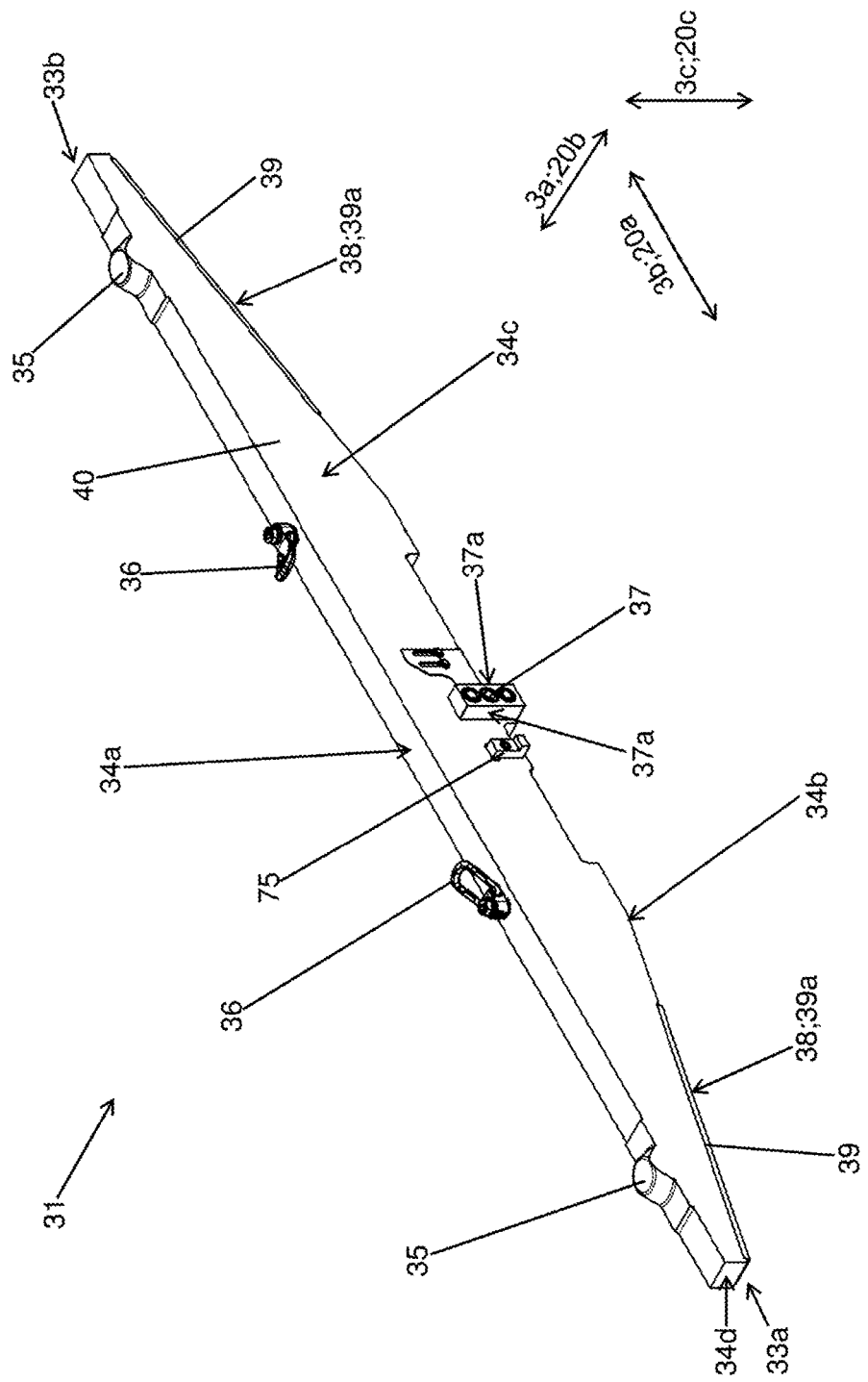
FIG. 12 shows a perspective view of a lifting bar of the inventive shuttle bar.

Each freight car 3 also includes at least four first locking devices (not depicted) for locking or latching the railcar side walls 11 in their folded-up position (FIGS. 1, 3). In particular at least two first locking devices are respectively available for each railcar side wall 11, wherein a first locking device is respectively present per support crosspiece 12. The locking devices are thus each disposed in the region of the support crosspieces 12 and lock these to the railcar headpieces 10. In addition the locking devices are preferably configured according to DE 10 2012 004 945 A1.

Accordingly a first locking device includes two locking bolts movable back and forth in the railcar longitudinal direction 3*a*. The locking bolts are each supported on the railcar headpiece 10 such that they are movable back and forth in the railcar longitudinal direction 3*a*. In addition the locking devices each include two side-wall-fixed locking housings with a locking opening. The locking bolts can move into the locking openings and move out therefrom. In the moved-in position the railcar side wall 11 is locked to the railcar headpiece 10. For each locking bolt a first locking device also respectively includes a preferably identical lever mechanism for activation, i.e., for moving in and out, of the locking bolt.

The freight car 3 also preferably includes a second locking device according to DE 10 2012 004 945 A1 that is able to be activated by placing of the railcar pallet 6.

For activating the first locking device, the freight-handling device 1 respectively includes a pivoting and unlocking device 15 (schematically depicted in FIG. 1). These are also known from DE 10 2012 004 945 A1. The pivoting and unlocking devices 15 serve for releasing the locking of the railcar side walls 11 by the locking bolts as well as for controlled, guided folding down and folding up of the railcar side walls 11. Thereby, a pivoting and unlocking device 15 is available for each first locking device. A pivoting and unlocking device 15 respectively includes two actuating levers which actuate the two lever mechanisms of the first locking device such that the two locking bolts are moved into their moved-out position. In addition, a pivoting and unlocking device 15 respectively includes a pivot lever able to be pivoted about a pivot axis parallel to the railcar longitudinal direction 3*a*, which pivot lever receives the railcar side wall 11. By pivoting the pivot lever, the railcar side wall 11 can be folded down and folded up.

The known railcar pallets 6 (FIGS. 1-5) each have a trough shape or a U-shaped cross-section. In particular, the railcar pallets 6 each include a pallet base wall 16 and two pallet side walls 17. At the front and back or end side the railcar pallets 6 have no walls so that they can be driven onto from a truck or the like. The pallet side walls 17 include on their upper end outwardly protruding mounting bars 18, by which the railcar pallets 6 can each be hung into the railcar side walls 11.

The freight-handling device 1 also includes a plurality of stationary lifting devices for respectively lifting a railcar pallet 6 from the railcar undercarriage 5 or from inventive shuttle bars 20 and placing it on the railcar undercarriage 6 or on the shuttle bars 20. The lifting devices are preferably respectively disposed on both sides of the track lines 2*a*; 2*b*, directly adjacent to the track lines 2*a*; 2*b* on the side of the loading platform. The lifting devices are thus not disposed between the two track lines 2*a*;2*b* but rather outside them, but preferably in the rail bed. The lifting devices are preferably mechanical lifting drives, which are driven by a combination of electric motors, spindles, and spindle nuts; alternatively they are hydraulically driven lifting devices.

The inventive freight-handling device 1 also includes a plurality of inventive shuttle bars 20 (FIGS. 2-9) that are each movable back and forth transversely, i.e., perpendicular, to the track lines 2*a*; 2*b* underfloor in transverse grooves 21 of the loading platforms 4.

For this purpose conveyor lanes 22 are present in the transverse grooves, on which conveyor lanes 22 the shuttle bars 20 are movable transverse to the track lines 2*a*; 2*b*. Preferably for each freight car 3 two shuttle bars 20 and four conveyor lanes 22 are available, namely two on each side of the rail system 2. The conveyor lanes 22 each end in front of the track lines 2*a*; 2*b*. However, conveyor lane segments are present in a known manner between the two track lines 2*a*;2*b*, which are disposed in continuation of the conveyor lanes 22, so that the shuttle bars 20 can move from the conveyor lanes 22 onto the conveyor lane segments and vice versa. The shuttle bars 20 can thereby move in a known manner under a freight car 3, which will be discussed in more detail below. In front of the track lines 2a; 2b the conveyor lanes 22 each have a gap 23, also in a known manner, into which the folded-down railcar side walls 11 of the railcar undercarriage 5 of the freight car 3 can lie, which is also discussed in more detail below.

The conveyor lanes 22 each include a guide track 24 and a plurality of support blocks 25. The guide tracks 24 each include a horizontal track base wall 24a and two lateral, vertical track walls 24b. The support blocks 25 of a conveyor lane 22 are disposed one-behind-another in the transverse direction. In addition the support blocks 25 each have a support frame 26 as well as two transport rollers 27. The transport rollers 27 are supported on the support frame 26 such that they are freely rotatable about a horizontal axis of rotation which is parallel to the track lines 2a;2b. The guide tracks 24 are also supported on the support frames 26. The transport rollers 27 are thus stationary. Thereby, the guide tracks 24 are disposed above the transport rollers 27, wherein the track base wall 24a respectively has openings through which the transport rollers 27 protrude somewhat upward.

Furthermore the conveyor lanes 22 include drive means 28, to which the shuttle bars 20 are each connected such that they are drivable back and forth perpendicular to the track lines 2a; 2b. The drive means 28 preferably include driven gears 29, which are disposed below the guide tracks 24 and also engage in openings in the track base wall 24a. The gears 29 are preferably driven with individual electric motors that are preferably electronically synchronized with each other. The synchronization is effected, for example, via a central control device which very precisely synchronizes the individual electric motors in rotational speed and angle of rotation. Alternatively thereto only a single electric motor is provided and the individual gears 29 that are connected to each other mechanically, e.g., via driveshafts.

The oblong-configured shuttle bars 20 each include a bar base frame 30 or bar base rack 30, a lifting bar 31, and a lifting bar drive device 32 for raising and lowering the lifting bar 31 relative to the bar base frame 30. In addition the shuttle bars 20 each have a horizontal bar longitudinal direction 20a, a horizontal bar transverse direction 20b perpendicular thereto and a vertical bar height direction 20c.

Each lifting bar 31 has a longitudinal extension in the bar longitudinal direction 20a. In addition the lifting bar 31, seen in the bar longitudinal direction 20a, includes a first and a second lifting bar end 33a; 33b. The lifting bar 31 also includes a lifting bar topside 34a, a vertically opposing lifting bar underside 34b, two lifting bar side surfaces 34c opposing each other in the bar transverse direction 20b, and preferably two, preferably vertical, lifting bar end surfaces 34d opposing each other in the bar longitudinal direction 20a.

The lifting bar topside 34a is preferably planar and configured horizontal. In addition the lifting bar 31 includes two centering pins 35 protruding upward from the lifting bar topside 34a. The centering pins 35 serve for receiving and centering a railcar pallet 6 on the shuttle bar 20, which is discussed in more detail below. The centering pins 35 each have an upwardly tapering shape. In addition the centering pins 35 are each disposed in the region of the lifting bar ends 33a; 33b. The lifting bar 31 also preferably includes two catch straps protruding upward from the lifting bar topside 34a for handling the lifting bar 31. The two catch straps 36 are disposed between the two centering pins 35 and foldable onto the lifting bar topside 34a.

The lifting bar side surfaces 34c are preferably configured to be planar and parallel to each other. In addition they are perpendicular to the bar transverse direction 20b. The lifting bar 31 includes two in particular cuboid guide blocks 37. A guide block 37 connects to each one of the two lifting bar side surfaces 34c and protrudes therefrom. The two guide blocks 37 preferably lie across from each other in the bar transverse direction 20b or are aligned with each other. In addition the guide blocks 37 are disposed centrally between the two lifting bar ends 33a;33b. The guide blocks 37 each have two planar guide surfaces 37a opposite each other in the bar longitudinal direction 20a, and perpendicular thereto. The block guide surfaces 37a serve for guiding the lifting bar 31 in the bar height direction 20c or to ensure that the lifting bar 31 is immovably connected to the bar base frame 30 in the bar longitudinal direction 20a. Furthermore, the lifting bar 31 preferably includes an anti-lift device 75 which prevents, for example, that the lifting bar 31, for example, due to a one-sided load, tips. For this purpose, the anti-lift device works together with a corresponding counter bearing of the bar base frame 30.

The lifting bar underside 34b inventively includes two respectively planar lifting bar drive surfaces 38 which each extend obliquely downward from one of the two bar ends 33a; 33b seen in bar longitudinal direction 20a. The lifting bar drive surfaces 38 serve for driving the lifting bar 31 in the vertical direction. The lifting bar drive surfaces 38 each enclose an acute wedge angle $\alpha$ with the bar longitudinal direction 20a of preferably 10 to 30°.

The lifting bar 31 preferably includes two plates 39 made from hardened metal, preferably from hardened steel, wherein metal surfaces 39a of the plates 39 form the lifting bar drive surfaces 38. The surfaces 39 are fixedly connected to a lifting bar base body 40 of the lifting bar 31, in particular welded thereto. The one-piece lifting bar base body 40 is solidly configured and comprised of metal, preferably of steel. The one-piece lifting bar base body 40 includes the two centering pins 35. The two catch straps 36 as well as the two guide blocks 37 are preferably configured as separate components and fixedly connected to the lifting bar base body 40, e.g., screwed thereto. The lifting bar base body 40 also includes the two lifting bar side surfaces 34c and the lifting bar topside 34a as well as a part of the lifting bar underside 34b.

The preferably cuboid bar base frame 30 also has a longitudinal extension in the bar longitudinal direction 20a. It serves for receiving and supporting the lifting bar 31 as well as the lifting bar drive device 32. The bar base frame 30 preferably includes two U-profile rails 41, a horizontal base plate 42 and preferably two vertical end plates 43 opposing in the bar transverse direction 20b (FIG. 13). The two U-profile rails 41 each have a central vertical crosspiece wall 41a and two horizontal side walls 41b; c protruding therefrom. The two U-profile rails 41 lie opposite each other in the bar transverse direction 20b. They are each disposed such that their side walls 41b; c face each other pairwise and oppose each other pairwise but are spaced from each other. The base plate 42 abuts on the two lower side walls 41b. The base plate 42 is also fixedly connected, in particular screwed, to the lower side walls 41b. The two lower side walls 41b and the base plate 42 form a base frame bottom wall 30a of the bar base frame 30. The two crosspiece walls 41a each form a base frame side wall 30b of the bar base frame 30. A longitudinal slot 44 is present between the two upper side walls 41*c* that terminate the bar base frame 30 upward; the longitudinal slot 44 serves for guiding through the lifting bar 31.

The U-profile rails 41, the base plate 42, and the two end plates 43 are preferably comprised of metal.

Furthermore the bar base frame 30 includes two or more guide blocks 46, which serve to fix the lifting bar 31 in the bar transverse direction 20*b*. For this purpose a guide block 46 is respectively disposed on the inside on one of the two crosspiece walls 41*a* and fixedly connected thereto. The guide blocks 46 protrude from an inner surface of the crosspiece wall 41*a*. They each have a flat block guide surface wherein the block guide surfaces are parallel to the lifting bar side surfaces 34*c* and abut thereon in a slidable manner.

The bar base frame 30 also includes four guide rollers 45 (FIG. 8) which serve for guiding the lifting bar 31. The guide rollers 45 are each connected to the bar base frame 30, in particular to one of the two frame side walls 30*b*, such that they are rotatable about an axis of rotation parallel to the bar transverse direction 20*b*. The guide rollers 45 are thereby disposed pairwise. A guide roller 45 pair is attached on the inside to the one frame side wall 30*b* and the other guide roller pair is attached to the other frame side wall. The two guide roller pairs are preferably disposed opposite each other in the bar transverse direction 20*b*. In addition, the two guide rollers 45 of a guide roller pair are disposed adjacent to each other or aligned with each other and spaced from each other in the bar longitudinal direction 20*a*.

In addition the bar base frame 30 includes a drive chain 47 which serves for driving the shuttle bar 20 parallel to the bar longitudinal direction 20*a*. For this purpose the drive chain 47 works together with the gears 29 or is in engagement therewith. The drive chain 47 extends in the bar longitudinal direction 20*a* and includes two chain ends 47*a*. It is disposed externally on the frame base wall 30*a*, in particular on the underside of the base plate 42, or runs along it, preferably between the two lower side walls 41*b*. The two chain ends 47 are externally attached on the two housing end plates 47. The drive chain is thus fixedly connected to the bar base frame 30, thus such that it cannot move and cannot rotate with respect thereto.

The lifting bar drive device 32 includes a drive motor 48, a spindle transmission 49, and two drive or lifting cars 50; 60. The drive motor 48 is preferably an electric motor, in particular embodied as a DC motor or as an AC motor respectively in synchronous or asynchronous design. The electric motor is preferably embodied with electronic control. Alternatively, other, for example, hydraulic, drive motors are also possible.

The two lifting cars 50; 60 each have a car housing 51, four driving rollers 52, a drive or lifting roller 53, and two nut housings 54. In addition the lifting cars 50; 60 each have a first and a second car end 50*a*; 50*b*; 60*a*; 60*b* seen in the bar longitudinal direction 20*a*. The two lifting cars 50; 60 are disposed opposite each other as seen in the bar longitudinal direction 20*a*. Thereby, the first car ends 50*a*; 60*a* face each other, the second car ends 50*b*; 60*b* face away from each other.

The car housing 51 respectively includes a car cover wall 55*a*, two car side walls 55*b*, and two car end walls 55*c*. The two car side walls 55*b* lie opposite each other in the bar transverse direction 20*b*. The two car end walls 55*c* lie opposite each other in the bar longitudinal direction 20*a*. The car cover wall 55*a* is preferably configured in a gabled-roof-shaped and includes two oblique roof sections 56*a*; *b* as well as a straight roof section 57. The oblique roof sections 56*a*; *b* each extend from the respective car end 50*a*;*b*;60*a*;*b* obliquely upward one atop the other. A continuous cover opening 58 is also present between the first oblique roof section 56*a* and the straight roof section 57, through which opening 58 the lifting roller 53 protrudes upward out of the car housing 51. On both sides of the cover opening 58 two guide bars 59 are also present, which have bar inner surfaces 59*a* for guiding the lifting bar 31.

The driving rollers 52 respectively are pairwise rotatably supported about the same axis of rotation in the car housing 51. The axes of rotation of the driving rollers 52 are thereby parallel to the bar transverse direction 20*b*. The two driving roller pairs are disposed one-behind-another in the bar longitudinal direction 20*a*. The driving rollers 52 serve for moving the lifting car 50; 60 inside the bar base frame 30, in particular on the frame base wall 30*a*, back and forth parallel to the bar longitudinal direction 20*a*. The lifting wagon 50; 60 is thus roller-supported and movable back and forth on the frame base wall 30*a* parallel to the bar longitudinal direction 20*a*. For this purpose the driving rollers 52 protrude downward from the car housing 51 which is open downward.

The lifting roller 53 is also supported rotatably about an axis of rotation parallel to the bar transverse direction 20*b* in the car housing 51. Thereby, the lifting roller 53 is disposed between the two driving roller pairs. In addition the lifting roller 53 is disposed higher in the vertical direction than the driving rollers 52, so that the lifting roller 53 is spaced from the frame base wall 30*a* and does not roll thereon. The lifting roller 53 also protrudes through the cover hole 58 upward out of the car housing 51.

The two nut housings 54 each include an internal thread for receiving a spindle 61; 62 of the spindle transmission 49. They are disposed on the first car end 50*a*; 60*a* adjacent to the car end wall 55*c*. In addition the two nut housings 54 are fixedly connected to each other using a connecting bridge 63 disposed between the two nut housings 54. The connecting bridge 63 and the two nut housings 54 together form a rocker 64, which is rotatably connected to the car housing 51 both about an axis of rotation parallel to the bar transverse direction 20*b* and about an axis of rotation parallel to the bar height direction 20*c*. For this purpose, a coupling part 65 is available. On one end, the coupling part 65 is rotatably connected about the axis of rotation which is parallel to the bar height direction 20*c* to the connecting bridge 63 using a first bearing bolt 66. On the other end, the coupling part 65 is rotatably connected about the axis of rotation which is parallel to the bar transverse direction 20*b* to the car housing 51 using a second bearing bolt 67.

The spindle transmission 49 includes two first spindles 61 as well as two second spindles 62. The spindles 61; 62 extend parallel to the bar longitudinal direction 20*a*. The two first spindles 61 serve for driving the first lifting car 50, and the two second spindles 62 serve for driving the second lifting car 60.

The two first spindles 61 are disposed adjacent to each other in the bar transverse direction 20*b*. In addition they are disposed on both sides of the lifting bar 31 and both sides of the car housing 51 of the first lifting bar 50. The two first spindles 61 are also in connection to the drive motor 48 at their first spindle end 61*a* such that they are rotatably drivable about their spindle axis. Thereby, for example, a pinion arrangement is present between the two first spindles 61 and a drive shaft of the drive motor 48. In addition, the first spindles 61 are rotatably mounted about the spindle axis in a bearing housing 68 at their first spindle ends 61*a*; the bearing housing 68 is fixedly connected to the bar base frame 30, in particular the frame base wall 30a. The first spindles 61 are also guided through the nut housing 54 of the first lifting car 50 and are in engagement with their internal thread. The first lifting car 50 is thus connected to the drive motor 48 via the first spindles 61 such that it is linearly drivable back and forth parallel to the bar longitudinal direction 20a. The first spindles 61 are disposed on both sides adjacent to the car side walls 55b.

In an analogous manner to the first spindles 61, the two second spindles 62 are adjacent to each other in the bar transverse direction 20b and disposed on both sides of the lifting bar 31 as well as on both sides of the car housing 51 of the second lifting car 60. The second spindles 62 are rotatably mounted about the spindle axis in a bearing housing 69 at their first spindle end 62a; the bearing housing 69 is fixedly connected to the bar base frame 30, in particular the frame base wall 30a. The second spindles 61 are also guided through the nut housing 54 of the second lifting car 60 and are in engagement with their internal threads. Thereby they are disposed on both sides adjacent to the car side walls 55b.

The first and second spindles 61; 62 thereby are each connected or coupled pairwise at their second spindle end 61b; 62b such that they are not rotatable with respect to each other about their spindle axes. The spindle axes of the first spindle 61 and the second spindle 62 coupled thereto are coaxial to each other. For respectively coupling a first spindle 61 with a second spindle 62 a driveshaft 70 is preferably respectively present. The driveshaft 70 compensates for angular offsets and axial offsets of the spindles 61; 62 and is torsion-resistant. Other mechanical coupling elements between the two spindles 61; 62 are possible, but the driveshaft 70 is preferred.

Further bearing housings 71 are available for supporting the spindles 61; 62 in the region of the second spindle ends 61b; 62b, which bearing housings 71 are fixedly connected to the bar base frame 30, in particular the frame base wall 30a.

The two second spindles 62 are thus each connected to the drive motor 48 via a first spindle 61 such that they are rotatably drivable in the same rotational direction as the first spindle 61. However, the two second spindles 62 include an external thread that runs in the opposite direction to the external thread of the first spindles 61. The second lifting car 60 is thus connected via the second spindles 61 to the drive motor 48 parallel to the bar longitudinal direction 20a such that it is linearly drivable back and forth, but in the opposite direction as the first lifting car 50. This means that the two lifting cars 50; 60 are simultaneously or synchronously moved towards or away from each other.

As already explained, the lifting cars 50; 60 serve to raise and lower the lifting bar 31. For this purpose the lifting bar 31 lies with its two lifting bar drive surfaces 38 respectively on one of the two lifting rollers 53.

Thereby the bar inner surfaces 59a of the guide bars 59 abut on the lifting bar side surfaces 34c. The lifting bar 31 is thus centered or fixed in the bar transverse direction 20b with respect to the respective lifting car 50; 60. In their initial position, the two lifting cars 50; 60 are moved so far away from each other that the lifting rollers 53 abut on the respective lifting bar drive surface 38 in the region of each of the two lifting bar ends 33a; b. The lifting bar 31 is thus positioned in its deepest or driven-in position.

In addition, as already explained above, the flat block guide surfaces of the housing-fixed guide blocks 46 slidingly abut on the lifting bar side surfaces 34c. The lifting bar 31 is thereby centered or fixed in the bar transverse direction 20b with respect to the bar base frame 30.

Furthermore one of the two guide blocks 37 is respectively disposed between the two guide rollers 45 of a guide roller pair. Thereby the guide rollers 45 abut on the block guide surfaces 37a of the guide blocks 37, so that the lifting bar 31 is centered or fixed in the bar longitudinal direction 20a with respect to the bar base frame 30. The lifting bar 31 is thus connected to the bar base frame 30 such that it is movable in the bar height direction 20c, but not movable in the bar length direction 20a and in the bar transverse direction 20b.

The shuttle bars 20, as already explained, are mounted movable back and forth in the bar longitudinal direction 20a or in the railcar transverse direction 3b, respectively on a conveyor lane 22. For this purpose the frame base wall 30a respectively abuts on the transport rollers 27. The shuttle bars 20 are thus roller guided or roller supported. The conveyor lanes 22 are, as also already explained, disposed underfloor in transverse grooves 21 of the loading tracks 4. The transverse grooves 21 include a constricted slot 73 opening onto the surface. This slot is dimensioned in its width such that only the lifting bars 31 can engage through the constricted slot 73. The constricted slot 73 is thus only slightly wider than the lifting bar 31. The rest of the shuttle bar 20 is disposed below the constricted slot 73 and not visible from above.

The shuttle bars 20 are also connected to the drivable gears 29 via the drive chains 47 such that they are drivable back and forth in the bar longitudinal direction 20a or in the railcar transverse direction 3b.

In the following, the inventive freight-handling method is now explained in more detail.

Provided no freight train is located in the freight-handling device 1, the pivot and unlocking devices 15 are located in their not actuated, waiting initial position. In the initial position the pivot and unlocking-devices 15 are moved away from the rail system 2. This means the pivot and unlocking-devices 15 do not lie in the movement path (railway loading gauge) of the freight car 3. In addition, both the pivot lever and the actuation levers of the pivot and unlocking-devices 15 are located in their non-actuated initial state.

The inventive shuttle bars 20 are located on one of the loading platforms 4a-d.

Now a freight train with a plurality of freight cars 3 travels into the freight-handling device 1. Each freight car 3 contains a railcar pallet 6 placed onto the railcar undercarriage 5. The mounting bars 18 of the railcar pallet 6 here lie on the wall top edges of the two railcar side walls 11.

When driving, the freight train drives over the lifting devices connected to the rail bed. Now as soon as the freight train with the freight cars 3 has stopped in the inventive freight-handling device 1, the railcar pallets 6 are lifted from the railcar undercarriages 5 using the stationary lifting devices. Thereby, the second locking devices, if present, are automatically unlocked by the lifting. In addition, the kingpins are optionally automatically unlocked.

Preferably simultaneously or shortly thereafter, the pivot- and unlocking-devices 15 are moved in the railcar transverse direction 3b to the waiting freight cars 3. Now the pivot and unlocking-devices 15 are actuated such that the actuating levers drive the locking bolts into their non-locking position. The railcar side walls 11 are thus unlocked. Simultaneously, the pivot levers pivot upward until they abut externally on the railcar side wall 11. It is thereby prevented that the railcar sidewalls 11 fall away outward uncontrollably. Now the pivot levers are pivoted downward and the railcar side walls 11, which are, preferably solely due to the force of gravity, lying thereon, are folded away outward.

When the railcar side walls 11 are folded completely outward, they are located in the above-described gaps 23 of the conveyor lanes 22. Consequently, the railcar side walls 11 can now be run over by the inventive shuttle bars 20. These are now activated and travel, driven via the gears 29, in railcar transverse direction 3b or bar longitudinal direction 20a over the folded-away railcar side walls 11 under the railcar pallets 6.

Thereby, the lifting bars 31 are preferably already located in their driven-out position or are driven out in the meantime. Alternatively thereto the lifting bars 31 are only driven out when the lifting bars 31 have arrived below the railcar pallet 6.

To drive out the lifting bars 31, the respective drive motor 48 is activated so that the spindles 61; 62 are driven. The spindles 61; 62 are rotated about their spindle axes such that the lifting cars 50; 60 are synchronously driven towards each other. Thereby, the two lifting rollers 53 roll along on the respective oblique lifting bar drive surface 38 away from the respective lifting bar end 33a; 33b, by what the lifting bars 31 are lifted. The lifting rollers 53 thus form a wedge device 74 with the respective oblique lifting bar drive surface 38. This means that the lifting bar drive device is configured as a wedge lifting device. A wedge lifting device is understood to be a lifting device that works according to the wedge principle to reduce drive-forces or torques and thus loads of the drive. This means that the lifting forces applied by a wedge lifting device are increased with the same drive torque in comparison to a lifting device without a wedge principle, namely increased by the wedge factor.

Then the railcar pallet 6 is placed down on the driven-out lifting bar 31 using the stationary lifting devices. Thereby the centering pins 35 are introduced in respective counter-centering-means of the railcar pallets 6.

The shuttle bars 20 loaded with the railcar pallets 6 are moved in the railcar transverse direction 3b or bar longitudinal direction 20a over the folded-away railcar side walls 11 away from the railcar undercarriage 5 and toward one of the loading platforms 4a-d. There, the railcar pallets 6 are lowered by lowering the lifting bars 31 and placed on the loading platform 4a-d. The lifting bars 31 are lowered here until they are disposed below the loading platform 4a-d. The lowering of the lifting bars 31 is effected by the two lifting cars 50; 60 being synchronously moved away from each other.

For this purpose the spindles 61; 62 are rotated in the opposite rotational direction as for lifting. Here, the two lifting rollers 53 roll on the respective oblique lifting bar drive surface 38 along to the respective bar end 33a; 33b, by what the lifting bar 31 is lowered.

Now the railcar pallet 6 is unloaded in a known manner and loaded with new cargo. The semi trailers 7 are moved down from or onto the railcar pallets 6, for example, by coupling a suitable towing vehicle (not depicted) to it.

After the railcar pallets 6 have been loaded with new cargo again, the railcar pallets 6 are lifted from the loading platforms 4a-d using the lifting bars 31 and moved from the shuttle bars 20 to the waiting railcar undercarriages 5 and lifted off the shuttle bars 20 by the rail-bed-fixed lifting devices. Thereafter the shuttle bars 20 travel back again into their initial position away from the track lines 2a;2b to one of the loading platforms 4a-d.

The railcar side walls 11 are folded up again using the pivot- and unlocking devices 15 and locked to the railcar headpieces 10. Then the railcar pallets 6 are set on and hung into the railcar side walls 11 using the stationary lifting devices. Thereby the kingpins are optionally introduced into the kingpin locking devices and locked. Now the freight train can leave the freight-handling device 1 again.

Since the inventive shuttle bars 20 include the active lifting bars 31 and a plurality of adjacently disposed loading platforms 4a-d are available on each side of the rail system 2, the freight-handling method can be varied in a variety of ways. For example, after the unloading of the railcar pallets 6 to one of the loading platforms 4a;b on the one side of the rail system 2, the shuttle bars 20 can be moved to one of the loading platforms 4c;d on the other side of the rail system 2 on which an already loaded railcar pallet 6 already stands, lift it, and move it to the empty railcar undercarriage 5.

In addition it is also possible to unload the freight train in stages and thereby shorten the freight-handling device 1 in its length.

For example, the freight-handling device 1 is only long enough to be able to unload half a freight train. The other, rear half of the freight train is located outside the loading platforms 4a-d. Then first the first half of the freight train is unloaded and loaded.

The unloaded railcar pallets 6 here are placed on the outer loading track 4b on the first side of the rail system 2. On the second side of the rail system 2, as described above, already loaded railcar pallets 6 stand ready on both loading platforms 4c;d. The loaded railcar pallets 6 disposed on the inner loading track 4c of the second side are then moved to the railcar undercarriages 5 and placed on them.

Now the freight train is moved forward until the second half of the freight train is disposed in the region of the loading platforms 4a-d or between them. The railcar pallets 6 are unloaded from the railcar undercarriages 5. Thereby they are set down on the further inner lying loading track 4a on the first side of the rail system 2. Subsequently the the loaded railcar pallets 6 disposed on the further outwardly disposed loading track 4d of the second side of the rail system 2 are moved to the railcar undercarriages 5 and set down on them.

While the second train half is loaded and unloaded, the previously described railcar controlling of the first train half can thereby be carried out by the car inspector (car inspection). For this reason, the time loss due to the double loading and unloading process is not too high. And the freight-handling device is significantly more space-saving and cost-effective since only a smaller number of shuttle bars 20, pivot- and unlocking devices 15, stationary lifting devices, etc. need to be available.

Of course the loading and unloading can also occur in more than two steps, depending on the length of the freight train and of the freight-handling device 1.

Due to the integrated lifting bar 31, the inventive shuttle bar 20 makes the principle possible with a plurality of adjacently disposed loading platforms 4. Two loading platforms or paths 4 make possible, for example, the preloading of an entire train despite the freight-handling terminal 1 being half the length. Standard industrial tracks are 100-400 m long but not 800 m. As a rule normal train lengths are 720 m if a freight-handling terminal 1 is 360 m long, it can be realized in many locations, in particular in Germany and Europe.

With the inventive shuttle bar 20, short lift paths are also made possible. In particular the railcar pallets need only by lifted by 100 mm.

The described wedge principle makes possible a low installation height of the shuttle bar 20. For this reason the entire freight-handling terminal 1 is realizable in flat design without underground construction. The height of the loading platforms 4 is also very low. These lie only 35 cm above the rail upper edge. The construction costs of the inventive freight-handling terminal are thereby also very low.

The inventive shuttle bar 20 can also be simply exchanged as a free-traveling element, e.g., in the event of maintenance or a fault, since it is not a fixed element.

The wedge principle of the active shuttle bar 20 also minimizes the load on the drive train in the shuttle bar 20. Because the forces/torques to be applied and transmitted for raising and lowering are significantly lower than the actual lifting force. However this only acts directly on the lifting bar 31. Since a wedge-lifting device is available on each lifting bar end 33a; 33b and the lifting bar drive surfaces 38 run in opposite directions and the lifting cars 50; 60 move in opposite directions, the forces in the bar longitudinal direction 20a cancel out each other. An additional supporting of the lifting bar 31 in the bar longitudinal direction 20a is therefore not required.

According to an advantageous aspect of the invention, the wedge devices 74 are thus configured such that during lowering or raising, the forces transmitted or acting from the lifting cars 50; 60 to the lifting bar 31 cancel each other out in the bar longitudinal direction 20a. In addition, the wedge devices 74 are preferably configured such that during lowering and raising the lifting forces transmitted or acting from the lifting cars 50; 60 to the lifting bar 31 in the bar height direction 20c are the same size.

In comparison to other lifting elements such as, for example, lifting cylinders, the lifting bar 31 is also very space-saving, in particular narrow. The slots 73 can therefore also be very narrow. Preferably the lifting bar 31 has a width of 15 to 40 cm, preferably 20 to 30 cm. At the same time it has a high stability.

It is also advantageous that the freight-handling device 1 includes no stationary lifting devices which are disposed on the loading platforms 4a-d.

The advantage of the rocker 64 is that the arising tensile and pressure forces can be transmitted without problems from the spindles 61; 62 to the lifting cars 50; 60. This is even the case if the frame base wall 30a of the bar base frame 30 should sag in the region of the lifting cars 50; 60 due to high weight forces. Because these height changes relative to the spindle transmission 49 are compensated by the pivoting of the rocker 64 about the axis of rotation parallel to the bar transverse direction 20b. Since the rocker 64 is also able to be pivoted relative to the car housing 51 about the axis of rotation parallel to the bar height direction 20c, no bending load of the spindles 61; 62 occurs, rather only the transformation of torsion torque to axial force for moving the lifting cars 50; 60 with the lifting rollers 53 under the lifting bar drive surface 38. The spindles 61; 62 are not designed for receiving bending torques, but in the ideal case should only convert torque into axial force.

The construction of the bar base frame 30 with the two U-profile bars 41 is also advantageous, since moments of high bending can thereby be supported. However, the bar base frames 30 can also be constructed differently, e.g., include only one base wall.

It also falls in the context of the invention here that the railcar pallet 6 is not placed on the railcar side walls 11, but can, for example, also be placed directly on the two railcar headpieces 10.

In addition, a freight-handling device 1 can also include only one freight car 3 and two shuttle bars 20, or only two shuttle bars 20 and the freight cars 3 are unloaded successively as described above.

In addition, the freight car 3 can also be a flatcar with a covered or closed railcar pallet according to the German patent application DE 10 2014 013 778.

In addition, the shuttle bars 20 can also be slidable supported on the conveyor lanes 22, for example on support rails, or the shuttle bars 20 themselves include bar-fixed transport rollers.

It is also possible that the rigid connection of the railcar headpieces 10 to each other does not occur via the railcar side walls 11 or only partially occurs via the railcar side walls 11, even if this is preferred. The rigid connection can also occur for example, via a central longitudinal beam.

In addition, the wedge devices 74, via which the lifting bars 31 are connected to the two lifting cars 50; 60 such that they can be raised and lowered, can also be realized in another manner. For example, the two lifting cars 50; 60 can include correspondingly oblique drive surfaces that run in opposite directions, on which rollers roll that are fixed with respect to the lifting bar 31. In addition the lifting cars 50; 60 and the lifting bars 31 can also slide on each other. The drive surfaces of the lifting bar 31 can also extend obliquely upward from the bar ends 33a; 33b instead of obliquely downward. The lifting cars 50; 60 are then moved towards each other for lowering the lifting bar 31 and away from each other for raising it.

In addition, the first and second spindles 61; 62 can also each be configured one-piece or connected to each other for conjoint rotation in another manner.

Furthermore the lifting cars 50; 60 need not be rollable supported on the arm base frame 30, even if this is preferred. It is important that the lifting cars 50; 60 are to movable supported on the bar base frame 30 parallel to the bar longitudinal direction such that they can move back and forth. For example, the lifting cars 50; 60 can also be able to be slidable supported.

While the above description constitutes the preferred embodiment of the present invention, it will be appreciated that the invention is susceptible to modification, variation and change without departing from the proper scope and fair meaning of the accompanying claims.

The invention claimed is:

1. A shuttle bar for a freight-handling device for transferring cargo from road to rail and vice versa via horizontal transverse loading, for moving a railcar pallet of a freight car to a loading platform and vice versa, wherein the shuttle bar includes a bar base frame horizontally movable in a shuttle bar longitudinal direction, and a lifting mechanism for raising and lowering the railcar pallet from or onto the loading platform, the lifting mechanism including a lifting bar extending horizontally along the shuttle bar longitudinal direction and horizontally movable by the bar base frame, and a lifting bar drive device supported by the bar base frame for raising and lowering the lifting bar relative to the bar base frame.

2. The shuttle bar according to claim 1, wherein the lifting bar drive device includes two lifting cars and at least one drive motor to which the lifting cars are connected such that the lifting cars are linearly drivable back and forth parallel to the shuttle bar longitudinal direction synchronously and in opposite directions, wherein the lifting cars are coupled to the lifting bar such that the lifting bar can be raised and lowered by moving the two lifting cars.

3. The shuttle bar according to claim 2, wherein the lifting cars are each connected to the lifting bar via a wedge device such that the lifting bar can be raised and lowered by the moving of the two lifting cars.

4. The shuttle bar according to claim 3, wherein the lifting bar includes two bar ends opposing in the bar longitudinal direction as well as a lifting bar underside, wherein the lifting bar underside includes two lifting bar drive surfaces, which each extend away obliquely downward or upward from one of the two bar ends in the bar longitudinal direction, wherein the lifting cars are each in engagement with one of the two lifting bar drive surfaces such that the lifting bar is able to be raised and lowered by the movement of the two lifting cars.

5. The shuttle bar according to claim 4, wherein the lifting bar drive surfaces each enclose an acute wedge angle with the bar longitudinal direction.

6. The shuttle bar according to claim 5, wherein the acute wedge angle is in the range of 10° to 30°.

7. The shuttle bar according to claim 4, wherein the lifting bar includes a lifting bar topside, the lifting bar underside vertically opposite thereto, and two lifting bar side surfaces opposing in a bar transverse direction.

8. The shuttle bar according to claim 7, wherein the lifting bar includes two centering pins, protruding upward from the lifting bar topside, for interacting with corresponding counter-centering features of the railcar pallet for centering of the railcar pallet on the shuttle bars, wherein the centering pins are each disposed in the region of one of the two lifting-bar ends.

9. The shuttle bar according to claim 4, wherein the lifting bars include two plates made from hardened metal, wherein plate surfaces of the plates form the lifting bar drive surfaces.

10. The shuttle bar according claim 4, wherein the two lifting cars each include a car housing and a lifting roller spaced from a frame base wall, wherein the lifting roller is rotatably connected to the car housing about an axis of rotation parallel to a bar transverse direction, and respectively abuts against one of the two lifting bar drive surfaces, the lifting roller being configured to roll on and along the one of the two lifting bar drive surfaces.

11. The shuttle bar according to claim 10, wherein the two lifting cars each include four driving rollers disposed pairwise, by which the lifting car is roller-supported and movable back and forth on the bar base frame parallel to the bar longitudinal direction.

12. The shuttle bar according to claim 11, wherein the lifting car is roller-supported and movable back and forth on the bar base frame.

13. The shuttle bar according to claim 11, wherein the lifting roller is disposed between two driving roller pairs.

14. The shuttle bar according to claim 4, wherein the lifting bar drive surfaces are planar.

15. The shuttle bar according to claim 3, wherein the wedge devices are configured such that during lowering and raising, the forces transmitted or acting from the lifting cars on the lifting bar cancel each other in the bar longitudinal direction.

16. The shuttle bar according to claim 2, wherein the lifting-bar drive device includes a spindle transmission, via which the two lifting cars are connected to the drive motor such that the two lifting cars are drivable synchronously and in opposite directions.

17. The shuttle bar according to claim 16, wherein the two lifting cars each include at least one nut housings with internal thread, and the spindle transmission includes spindles that are each in engagement with the internal thread of one of the nut housings such that the lifting cars are moved parallel to the bar longitudinal direction by rotation of the spindles about spindle axes.

18. The shuttle bar according to claim 17, wherein the two lifting cars each include a car housing and a lifting roller spaced from a frame base wall, wherein the lifting roller is rotatably connected to the car housing about an axis of rotation parallel to a bar transverse direction, and respectively abuts against one of the two lifting bar drive surfaces, the lifting roller being configured to roll on and along the one of the two lifting bar drive surfaces, and the two lifting cars each include two nut housings, the nut housings being rotatably connected to the car housings about an axis of rotation parallel to the bar transverse direction.

19. The shuttle bar according to claim 18, wherein the spindle transmission includes two first spindles for driving a first lifting car of the two lifting cars and two second spindles for driving the second lifting car, wherein the first and second spindles are each disposed adjacent to each other in the bar transverse direction and on both sides of the lifting bar and on both sides of the car housing of the respective first or second lifting car, wherein the first spindles are connected to the drive motor such that they are rotatably drivable about their spindle axes and wherein the first spindles are each passed through one of the two nut housings of the first lifting car and are in engagement with the internal thread, wherein the second spindles are each passed through one of the two nut housings of the second lifting car and are in engagement with the internal thread, wherein respectively a second spindle is connected to one of the first spindles about the mutually coaxial spindle axes such that they cannot rotate.

20. The shuttle bar according to claim 19, wherein each first spindle is connected to a second spindle via a drive shaft.

21. The shuttle bar according to claim 19, wherein the first and second spindles each include opposing external threads.

22. The shuttle bar according to claim 18, wherein the nut housings are pivotable connected to the car housings about an axis of rotation parallel to a bar height direction.

23. The shuttle bar according to claim 18, wherein the two nut housings of a lifting car are fixedly connected to each other.

24. The shuttle bar according to claim 1, wherein the lifting bar is connected to the bar base frame such that it is movable relative to the bar base frame in a shuttle bar height direction, but not movable relative to the bar base frame in the shuttle bar longitudinal direction and not movable relative to the bar base frame in a shuttle bar transverse direction.

25. A freight-handling device for transferring cargo from road to rail and vice versa via horizontal transverse loading using railcar pallets removable from a railcar undercarriage of a freight car and receiving the cargo, comprising:
a rail system with two track lines,
at least one loading platform disposed adjacent to the rail system and parallel thereto,
lifting devices for raising and lowering the railcar pallets from or onto the respective railcar undercarriage, and
a plurality of shuttle bars movable transverse to the rail system for raising and lowering the railcar pallet from or onto the loading platform and for the transverse transport of the railcar pallets from the freight car to the loading platform and vice versa, each of the shuttle bars including a bar base frame horizontally movable in a shuttle bar longitudinal direction, a lifting bar extending horizontally along the shuttle bar longitudinal direction and horizontally movable by the bar base frame, and a lifting bar drive device supported by the bar base frame for raising and lowering the lifting bar relative to the bar base frame.

26. The freight-handling device according to claim 25, wherein a plurality of the loading platforms are respectively disposed on both sides adjacent to the rail system, which loading platforms are disposed adjacent to one another in a direction transverse to the track lines.

27. The freight-handling device according to claim 25, wherein the railcar undercarriage includes a railcar frame and two bogies or individual axles, spaced from each other in a railcar longitudinal direction, for moving the freight car onto the rail system, wherein the railcar frame includes two railcar headpieces spaced from each other in the railcar longitudinal direction, the railcar headpieces are each disposed end-side on the railcar undercarriage and are supported on one of the two bogies or one of the two individual axles, and wherein the railcar frame includes two downfoldable railcar side walls, which are pivotably connected to the railcar headpieces about a side-wall pivot axis parallel to the railcar longitudinal direction.

28. The freight-handling device according to claim 25, wherein the shuttle bars are movably supported underfloor on conveyor lanes, which are disposed in transverse grooves of the at least one loading platform, wherein the lifting bars in a retracted position are disposed below a surface of the loading at least one loading platform, wherein the transverse grooves include a slot opening onto the surface of the at least one loading platform, the slot having a narrowed width and the lifting bar having an extended position, wherein only the lifting bar in the extended position can engage through the slot, wherein a remainder of the shuttle bar is disposed below the slot.

29. The freight handling device according to claim 25, wherein the lifting devices are stationary.

30. A freight-handling method for transferring cargo from road to rail comprising the following steps:
   providing a freight-handling device for transferring cargo from road to rail and vice versa via horizontal transverse loading using railcar pallets removable from a railcar undercarriage of a freight car and receiving the cargo, including:
      a rail system with two track lines,
      a loading platform disposed adjacent to the rail system and parallel thereto,
      lifting devices for raising and lowering the railcar pallets from or onto the respective railcar undercarriage,
      a plurality of shuttle bars movable transverse to the rail system for raising and lowering the railcar pallet from or onto the loading platform and for the transverse transport of the railcar pallets from the freight car to the loading platform and vice versa, each of the shuttle bars including a bar base frame horizontally movable in a shuttle bar longitudinal direction, a lifting bar extending horizontally along a shuttle bar longitudinal direction and horizontally movable by the bar base frame, and a lifting bar drive device supported by the bar base frame for raising and lowering the lifting bar relative to the bar base frame,
   and using the shuttle bars for transverse transport of the railcar pallet from the railcar frame to the loading platform and vice versa.

31. The freight-handling method according to claim 30 further comprising the steps:
   lifting of the railcar pallets from the railcar undercarriages,
   moving the shuttle bars under the railcar pallets,
   setting the railcar pallets onto the shuttle bars,
   transporting the railcar pallets from the railcar undercarriages to the loading platform using the shuttle bars,
   unloading and loading of the railcar pallets,
   transporting the loaded railcar pallets from the loading platform to the railcar undercarriages using the shuttle bars,
   lifting off the railcar pallets from the shuttle bars,
   moving the shuttle bars to the loading platform, and
   setting down the railcar pallets onto the railcar undercarriages.

32. The freight handling method according to claim 31, wherein the step of folding down the railcar side walls after lifting of the railcar pallets from the railcar undercarriages and the step of folding up the railcar side walls after moving the unloaded shuttle bars to the loading platform.

33. The freight-handling method according to claim 30, wherein the freight train includes at least a first group of freight cars and a second group of freight cars, the method further comprising unloading and loading the freight train in a stepwise manner such that initially the first group of the freight cars of the freight train is simultaneously unloaded and loaded, the freight train is subsequently moved farther, and thereafter the second group of freight cars is simultaneously unloaded and loaded.

\* \* \* \* \*